UNITED STATES PATENT OFFICE.

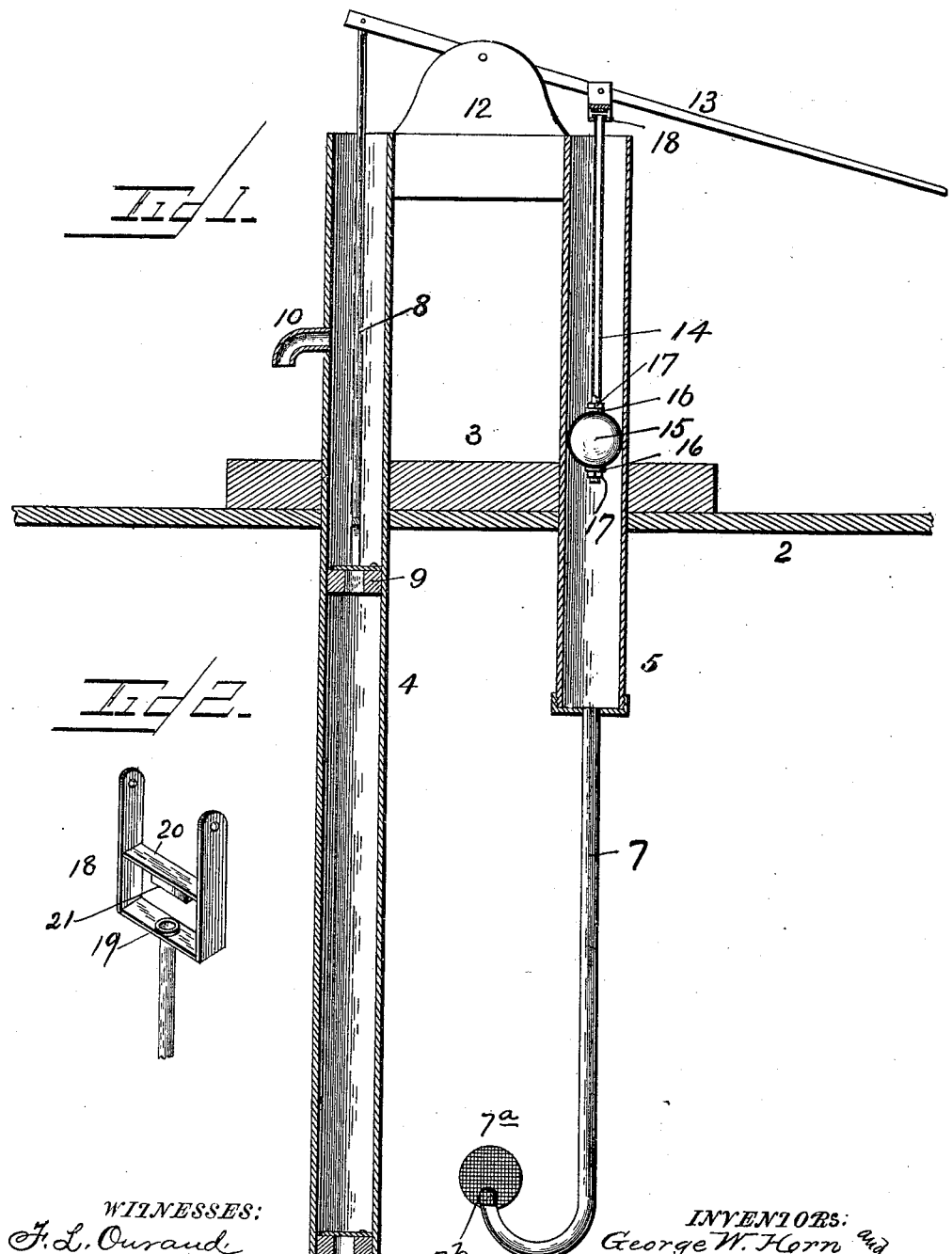

GEORGE W. HORN AND JOSIAH L. HORN, OF FARMINGTON, ASSIGNORS, BY DIRECT AND MESNE ASSIGNMENTS, TO WILLIAM W. NORMAN, OF DELTA, MISSOURI.

PURIFYING-PUMP.

SPECIFICATION forming part of Letters Patent No. 480,096, dated August 2, 1892.

Application filed January 13, 1892. Serial No. 417,924. (No model.)

*To all whom it may concern:*

Be it known that we, GEORGE W. HORN and JOSIAH L. HORN, citizens of the United States, and residents of Farmington, in the county of St. François and State of Missouri, have invented certain new and useful Improvements in Purifying-Pumps; and we do hereby declare that the following is a full, clear, and exact description of the invention, which will enable others skilled in the art to which it appertains to make and use the same, reference being had to the accompanying drawings, which form a part of this specification.

Our invention relates to improvements in the air-cylinders of purifying-pumps of that description in which air is forced through the water contained in a well or cistern for the purpose of purifying the same.

The object of the invention is to provide a pump of the above description which, while simple and economical in construction, will effectually perform the function for which it is designed.

The invention consists in the novel construction and combination of parts hereinafter described and claimed.

In the accompanying drawings, Figure 1 represents a sectional view of a pump constructed in accordance with our invention. Fig. 2 is a detail perspective view of the cage.

In the said drawings the reference-numeral 2 designates the pump-platform, and 3 the pump-sill.

Passing through the platform and sill are two tubes or cylinders 4 and 5, the cylinder 4 being the pump-cylinder, which extends down to near the bottom of well and is provided with an ordinary check-valve 6. The cylinder 5, which is the air-cylinder, is provided with a downwardly-extending pipe 7 of smaller diameter than said cylinder and its lower end is bent upwardly, as shown, and provided with a wire nozzle 7ª and a ball 7ᵇ, which is adapted to close the outlet of said pipe by gravity and prevent access of water thereto.

The numeral 8 designates the pump-rod, having a valve 9, which may be of any ordinary construction, and 10 the outlet for the water.

The cylinders 4 and 5 are connected together at their upper ends by means of cross-head 12, to which is pivoted a handle 13, connected with the pump-rod.

In the air-cylinder is located a pipe or tube 14, provided at its lower end with a plunger 15, consisting of a rubber ball having a central aperture through which said pipe passes, being secured thereto by means of washers 16 and nuts 17. The upper end of pipe 14 passes through an aperture in a cage 18, secured to the handle 13, and is provided with a nut or collar 19. This cage is provided with a cross-piece 20, having a valve 21 on its under side, against which the upper end of pipe 14 abuts when the handle is depressed, so as to close the upper end thereof.

The operation is as follows: By operating the handle the pump-rod is alternately elevated and lowered, so as to raise the water in the ordinary manner. As said handle is elevated the upper end of the air-pipe 14 will be open and said pipe will be elevated by means of the nut 19 and the cage and allowing air to enter the air-cylinder. Upon depressing the handle the upper end of pipe 14 will strike the valve 20, closing said pipe and causing the air in the cylinder 5 to be forced down pipe 7 into and through the body of water contained in the well, whereby the same is purified and rendered fit for drinking and household purposes.

Having thus described our invention, what we claim is—

1. In a pump of the character described, the combination, with the air-cylinder having a downwardly-extending pipe provided with a wire nozzle and a gravity-valve, of the plunger located in said cylinder provided with an aperture, the vertically-movable tube passing through said aperture, and having a nut or collar at its upper end, the cage connected with the pump-handle, provided with an aperture through which said rod loosely passes, the cross-piece, and valve, substantially as specified.

2. In an air-cylinder, the combination, with the operating-handle and the cage connected therewith, having an aperture in its lower side, and a cross-piece and valve, of the vertically-movable tube passing loosely through said aperture and provided with a nut or collar, and the plunger having an aperture through which the lower end of said tube passes, substantially as described.

In testimony that we claim the foregoing as our own we have hereunto affixed our signatures in presence of two witnesses.

GEORGE W. HORN.
JOSIAH L. HORN.

Witnesses:
SAM. L. ASBURY,
R. FUGATE.